(12) United States Patent
Mizukami et al.

(10) Patent No.: US 8,335,094 B2
(45) Date of Patent: Dec. 18, 2012

(54) POWER FREQUENCY CONVERTER

(75) Inventors: Mineo Mizukami, Tokyo (JP); Hiroyuki Hozumi, Tokyo (JP); Tatsuya Yamaguchi, Tokyo (JP)

(73) Assignee: Jamco Corporation, Tokyo (JP)

( * ) Notice: Subject to any disclaimer, the term of this patent is extended or adjusted under 35 U.S.C. 154(b) by 408 days.

(21) Appl. No.: 12/566,034

(22) Filed: Sep. 24, 2009

(65) Prior Publication Data

US 2010/0080031 A1  Apr. 1, 2010

(30) Foreign Application Priority Data

Sep. 25, 2008 (JP) ................................. 2008-245611

(51) Int. Cl.
*H02H 7/10* (2006.01)
*H02M 5/45* (2006.01)
(52) U.S. Cl. ................. 363/51; 363/36; 363/37
(58) Field of Classification Search ............. 363/34, 363/36, 37, 50, 51, 52, 56.03; 361/93.9; 323/908
See application file for complete search history.

(56) References Cited

U.S. PATENT DOCUMENTS

| 4,973,896 A * | 11/1990 | Shiga et al. | 322/28 |
| 4,992,920 A * | 2/1991 | Davis | 363/36 |
| 7,830,680 B2 * | 11/2010 | Eguchi et al. | 363/37 |

FOREIGN PATENT DOCUMENTS

JP  2005-160257 A  6/2005

* cited by examiner

*Primary Examiner* — Gary L Laxton
(74) *Attorney, Agent, or Firm* — Westerman, Hattori, Daniels & Adrian, LLP

(57) ABSTRACT

A current control circuit (active element) is provided that is connected between a rectifier of a DC power source and a smoothing capacitor in a power frequency converter and that controls a variation in the rectified current caused by a variation in the instantaneous power consumption of the load device. When the rectified current increases, the current control circuit limits the current to have a reference current value or lower and, when the rectified current decreases, the current control circuit increases the current to have a value close to the reference current to thereby suppress the rectified current from the rectifier to a substantially-constant value. This consequently mitigates the influence on the primary power source by the variation in the instantaneous power consumption of the load device, thus clearing the Load Demand Variation specification required for the power source to be used in an aircraft.

2 Claims, 10 Drawing Sheets

POWER FREQUENCY CONVERTER

The present application is based on and claims priority of Japanese patent application No. 2008-245611 filed on Sep. 25, 2008, the entire contents of which are hereby incorporated by reference.

BACKGROUND OF THE INVENTION

1. Field of the Invention

The present invention relates to a power frequency converter for an electronic device mounted in an aircraft.

2. Description of the Related Art

As a power frequency converter for converting three-phase AC power source to single-phase power frequency, a control apparatus of a single-phase/three-phase conversion apparatus is disclosed in Japanese Patent Unexamined Publication No. 2005-160257 for example that can compensate a pulsation amount of a single-phase instantaneous power. However, this apparatus uses a method for preparing a converter without a smoothing capacitor. This causes power having a poor quality not suitable for an aircraft-level power frequency converter.

An electronic device mounted in an aircraft must use a power source to be used in an aircraft based on a specification determined for a device provided in an aircraft. Generally, in the case of an electronic device that is based on an electronic device developed for the market and that is subjected to a minor change for an electronic device mounted in an aircraft, a method is used to change the design of a power part so that the power part can be used for the power source of the aircraft specification. In the case of some electronic devices however, it is very difficult to adapt the electronic devices to a power frequency to be used in an aircraft. Although the power frequency of an electronic device mounted in an aircraft is different depending on the fuselage of the aircraft, the power frequency is recently as 6 to 13.3 times higher than a commercial power frequency and has a very wide frequency variation range of 440 Hz.

When an electronic device developed for a commercial application is subjected to a design change so as to be adapted for the power source used in an aircraft as described above, a minor change may be insufficient to adapt the electronic device to the power source to be used in an aircraft. For the device as described above, a power frequency converter for an electronic device mounted in an aircraft (hereinafter simply referred to as "converter") is additionally prepared through which the power frequency is converted to the one based on a general commercial power specification to thereby allow the electronic device to operate stably. For example, FIG. 4 schematically illustrates the configuration of a conventional converter. FIGS. 5A-B schematically illustrate a conventional converter circuit. In the usage pattern as described above, some electronic device as a load device connected to the converter may cause an interference to the power source to be used in an aircraft of the supply side of the converter.

This interference is caused in the supply current to the converter due to the variation of the instantaneous power consumption of the load device. This interference is most remarkably caused when the load device is a single-phase AC power source. This type of interference does not occur in principle if the load device is a three-phase AC power source and is used in a balanced load status. However, the interference as described above in a power frequency converter for an electronic device mounted in an aircraft may deviate from a specification of Load Demand Variation specified by the aircraft power specification.

SUMMARY OF THE INVENTION

When a converter is used to convert an aircraft power frequency to a commercial power frequency to supply the power to the load, even when the consumption current of the load device has a fixed value, the single-phase AC power source having a variation in the instantaneous power consumption causes an influence by the variation in the instantaneous power consumption to finally have an adverse influence on the supply power of the converter.

For example, when the load device is a single-phase AC power source of 60 Hz, the instantaneous power consumption varies with a cycle of 120 Hz. This variation causes an influence on the primary supply power of the converter (e.g., 360 Hz to 800 Hz) to cause a variation in the supply current (also may called as modulation). This is due to that a charge amount accumulated in a DC power source as an intermediary in the converter for generating a power frequency of the load device through a PWM switch varies due to the instantaneous power consumption of the load device to consequently cause a variation in the value of the current supplied to the DC power source.

The accumulated charge amount of the DC power is determined based on the product of the capacity of the smoothing capacitor ("C7" in the drawing) and the charging voltage. The higher the accumulated charge amount is, the smaller the influence by the variation in the instantaneous power consumption of the load device is. On the other hand, regarding the supply power side to the converter, it is specified that the Load Demand Variation (i.e., a difference between a peak value and a dip value variation of the load current due to the influence by the load) must be 5% or lower of an average load current.

In order to prevent the supply power of the converter from interfering with the load power, the accumulated charge amount may be increased in the DC power as an intermediary or a low-pass filter for example may be provided in the smoothing circuit to effectively remove the 120 Hz component. When the converter has a high output power however, an element (LC or RC) constituting the low-pass filter also has a high capacity, thus causing a disadvantage where the converter has increased volume and weight and the cost is also comparatively high.

A power frequency converter for an electronic device mounted in an aircraft of the present invention includes a current control circuit (active element) that is connected between a rectifier of a DC power source and a smoothing capacitor in the converter and that controls variation in the rectified current caused by the variation in the instantaneous power consumption of a load device. When the rectified current increases, the current control circuit limits the current to be equal to or lower than a reference current value.

As a result, by suppressing the charging voltage to the smoothing capacitor, the current during the decrease of the rectified current can be increased to a value close to the reference current value. By suppressing the rectified current to a substantially fixed value, the influence on the primary power source by the variation in the instantaneous power consumption of the load device can be reduced and the Load Demand Variation specification of the fuselage supply power regarding the converter is cleared. The reference current value of the current limit circuit is corrected so that the reference current value is increased when the current control circuit has an average operation voltage higher than the reference value, and the reference current value is reduced when the current control circuit has an average operation voltage lower than the reference value on the contrary. By doing this, the power frequency converter can operate so as to correspond to a change in the average power consumption of the load device and the voltage value of the supply power to thereby control the current control circuit to automatically move to a stable operating point.

According to the present invention, a current control circuit 6 can efficiently use an active element to thereby match the Load Demand Variation. Thus, when compared with the method of increasing the smoothing capacitor for which the physical quantity is high and the method of constituting a low-pass filter or the like, the present invention is advantageous in that the attachment area and the weight are small and are low-cost.

DESCRIPTION OF THE PREFERRED EMBODIMENTS

Hereinafter, with reference to the drawings, an embodiment of the present invention will be described.

Illustrative Embodiment

Figure 1:
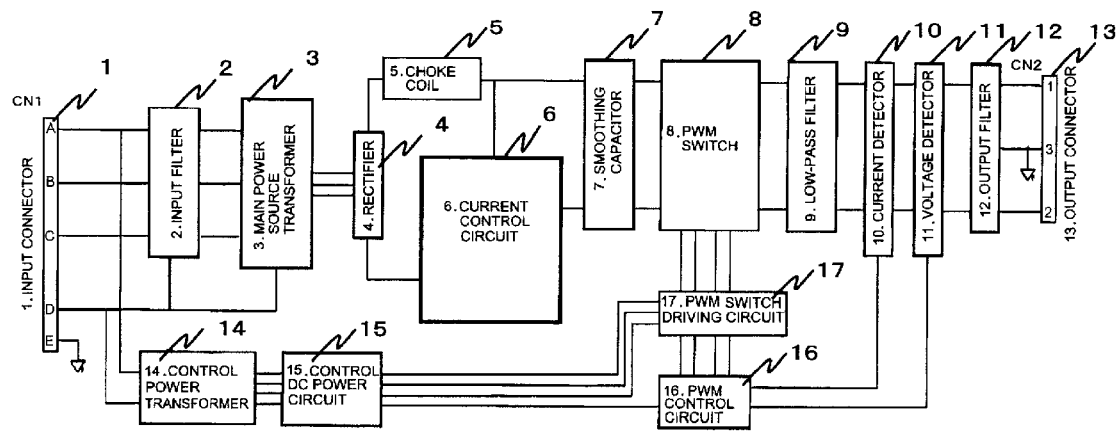
FIG. 1 is a schematic view illustrating a power frequency converter for an electronic device mounted in an aircraft of an illustrative embodiment of the present invention.

As an actual illustrative embodiment, a general-purpose microwave oven was used as a load device and a power frequency converter having a configuration shown in FIG. 1 was used and caused to operate. The load device has a power source voltage of single-phase 200V, a power frequency of 60 Hz, and an output power of 3000 W. By providing the current control circuit 6 as a characteristic of the present invention, when compared with the same configuration having no such a control, the load variation demand value could be improved to ¹⁄₂₀ or lower (100% to 5%).

FIG. 1 illustrates a configuration of a power frequency converter for an electronic device mounted in an aircraft of an illustrative embodiment of the present invention. In FIG. 1, the reference numeral 1 denotes an input connector (CN1), the reference numeral 2 denotes an input filter, the reference numeral 3 denotes a main power source transformer, the reference numeral 4 denotes a rectifier, the reference numeral 5 denotes a choke coil, the reference numeral 6 denotes a current control circuit, the reference numeral 7 denotes a smoothing capacitor, the reference numeral 8 denotes a PWM switch, the reference numeral 9 denotes a low-pass filter, the reference numeral 10 denotes a current detector, the reference numeral 11 denotes a voltage detector, the reference numeral 12 denotes an output filter, the reference numeral 13 denotes an output connector (CN2), the reference numeral 14 denotes a control power transformer, the reference numeral 15 denotes a control DC power source circuit, the reference numeral 16 denotes a PWM control circuit, and the reference numeral 17 denotes a PWM switch driving circuit.

Figure 2A:
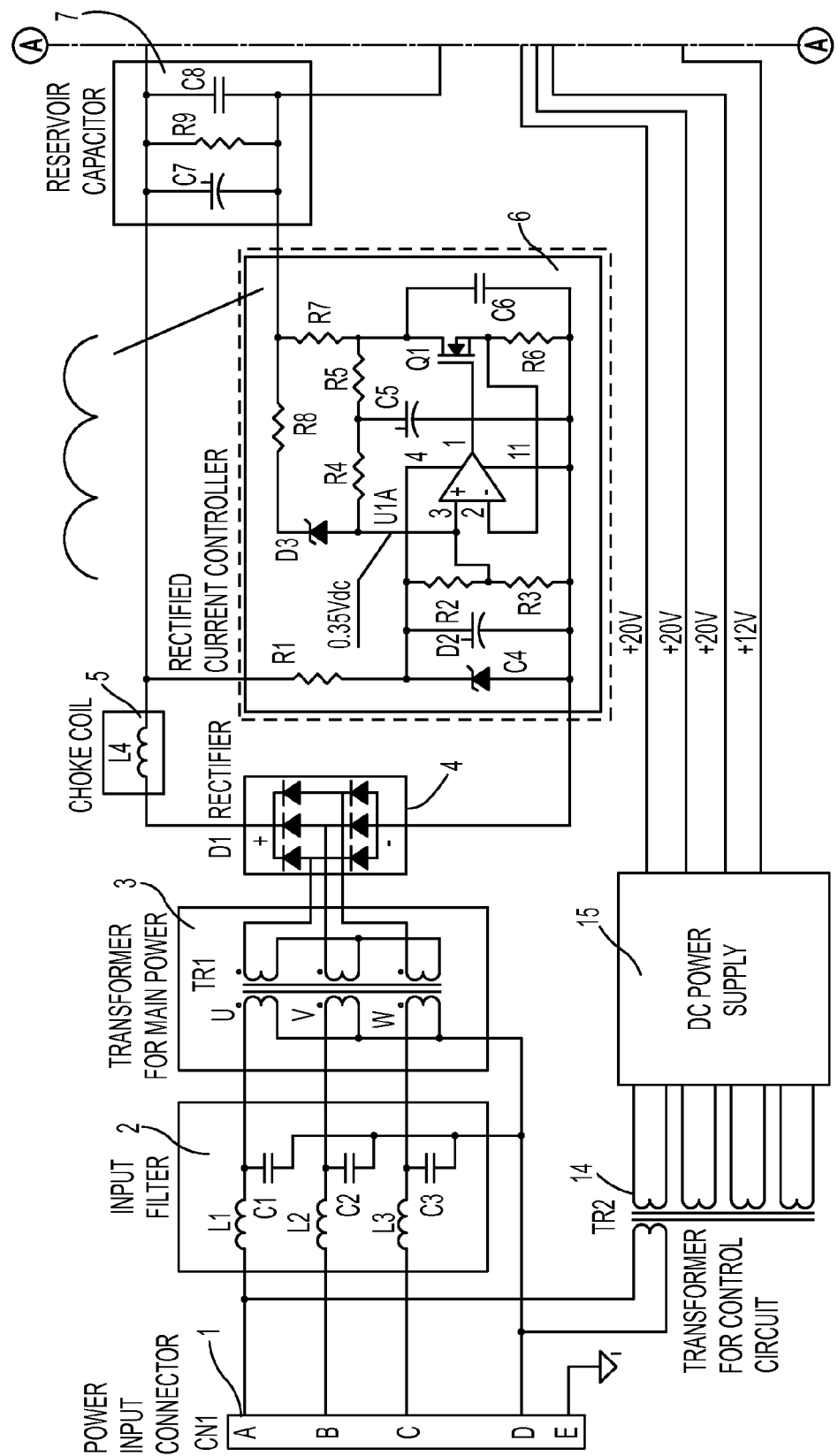
FIGS. 2A-B are a schematic circuit diagram illustrating a power frequency converter for an electronic device mounted in an aircraft of an illustrative embodiment of the present invention.
Figure 2B:
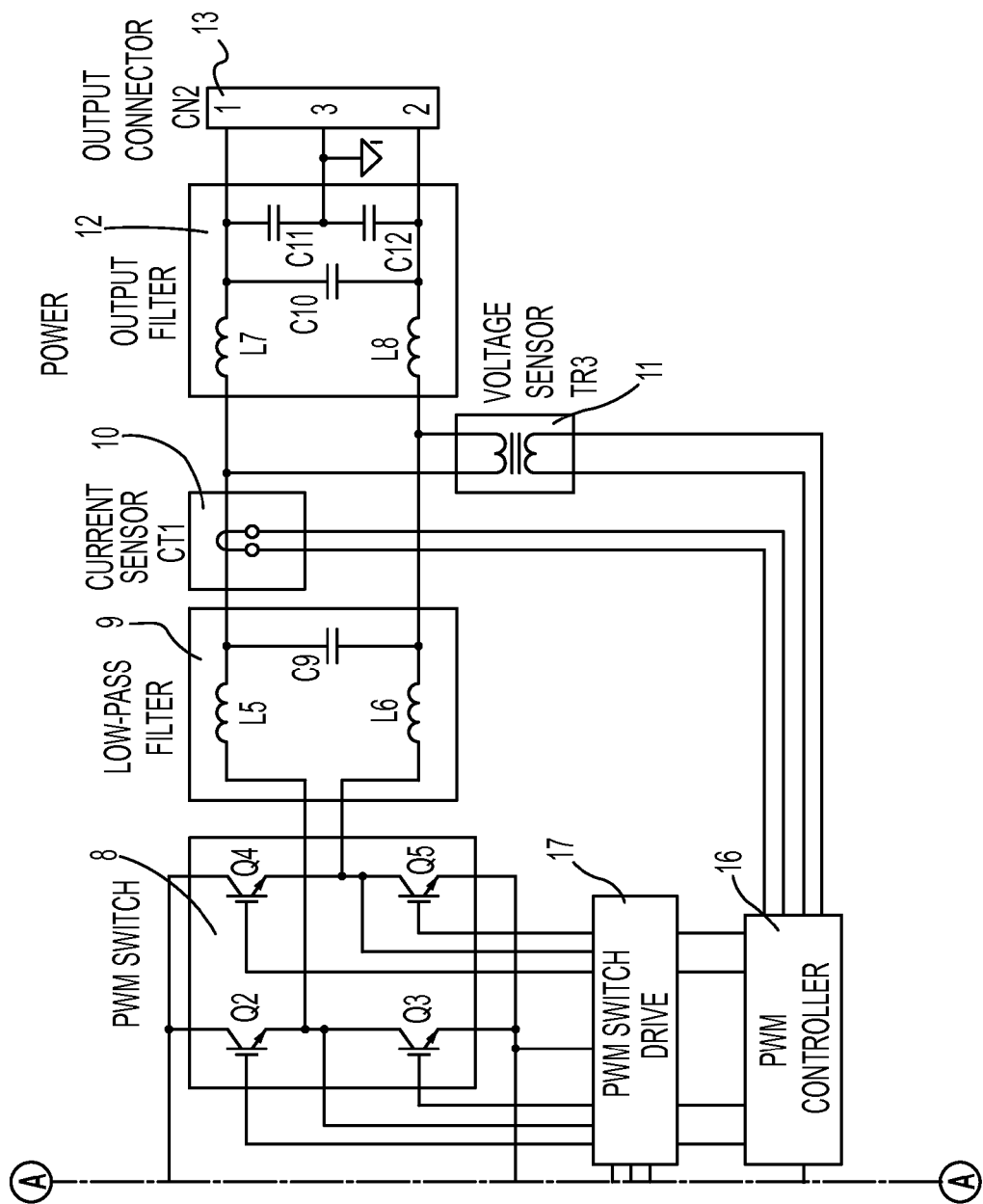

FIGS. 2A-B are a schematic circuit diagram illustrating a power frequency converter for an electronic device mounted in an aircraft of an illustrative embodiment of the present invention. FIGS. 2A-B will be described. The input connector 1 (CN1) is connected to three-phase alternate current supplied from a fuselage (nominal 360 Hz to 800 Hz, 115V, power feeding by Y connection). The alternate current is inputted via the input filter 2 for blocking unnecessary irradiation and radiation that is composed of L1, L2, L3, C1, C2, and C3 to the power transformer 3 (TR1) for the main power source. The power transformer 3 (TR1) converts the Y connection input to a Δ connection output and steps up the output voltage to about 300V to subsequently supply an output to the rectifier 4 (D1) where the output is converted to direct current.

The positive (+) terminal of the rectifier 4 (D1) is connected via the power factor-improving choke coil 5 (L4) to the positive terminal of the smoothing capacitor 7 (C7) for a DC power source. On the other hand, the negative (−) terminal of the rectifier 4 (D1) is connected via the current control circuit 6 to the negative terminal of the smoothing capacitor 7 (C7).

The smoothing capacitor 7 (C7) is parallely connected to high resistance R9 for discharging the accumulated voltage in C7 in a very small amount and a high-frequency bypass capacitor C8. At both ends of the smoothing capacitor 7 (C7), about 300V of DC voltage is sequentially charged and is supplied to the PWM switch elements 8 IGBT=Insulated Gate Bipolar Transistors) Q2 to Q5 to which power is discharged. Then, the output is subjected to a PWM modulation (Pulse Width Modulation) so as to have the frequency and the waveform of the power used by an electronic device mounted in an aircraft as the load device.

The output subjected to the PWM modulation is sent through the low-pass filter 9 consisting of L5, L6, and C9 so that a harmonic component of the PWM-modulated wave is blocked. Then, the output is sent via the current detector 10 (CT1) and the voltage detector 11 (TR3). Then, the output is sent via the output filter 12 that consists of L7, L8, C10, C11, and C12 and that blocks unnecessary irradiation and radiation. Thereafter, power is supplied from the output connector 13 (CN2) to the load device.

The primary input of the control power transformer 14 (TR2) receives the phase-A alternate current voltage from the input connector 1 (CN1). The secondary output of the control power transformer 14 (TR2) generates an alternate current voltage for generating 4 types of DC voltages used in the control circuit. The alternate current voltage is supplied to the control DC power source circuit 15. The control DC power source circuit 15 generates 12V power for the PWM controller 16 and 3 types of 20V voltages used in the PWM switch drive 17 to output the power and voltages to the PWM controller 16 and the PWM switch drive 17, respectively.

The PWM controller 16 generates 4 types of PWM modulated waves for outputting single-phase 200V, 60 Hz, and power 3000 W as a power source used in the load device. The PWM waveform is controlled to receive the output voltage information from the voltage detector 11 to feed back the information to the PWM modulation waveform generation circuit to maintain a rated voltage of 200V.

When the current detector 10 senses 20A or more, it is recognized that the load is abnormal and excessive current flows to thereby stop the PWM output. The PWM switch drive 17 converts the 4 types of PWM modulation waveforms generated in the PWM controller 16 to voltages for driving the gates Q2 to Q5 of the PWM switch 8.

Figure 3:
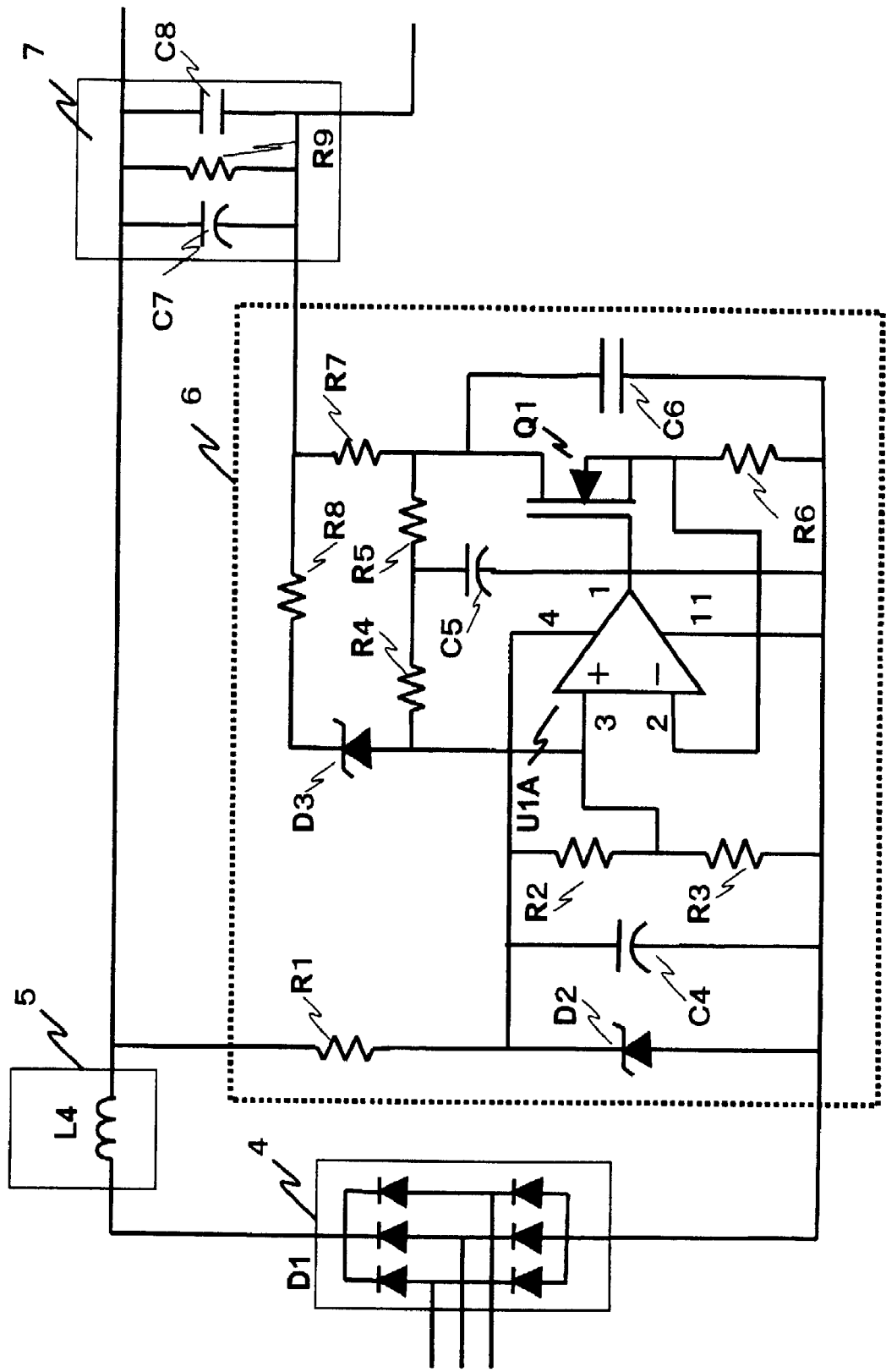
FIG. 3 is an illustrative circuit diagram illustrating a power control circuit of the power frequency converter of an illustrative embodiment of the present invention.

Next, the operation of the current control circuit 6 will be described. FIG. 3 is illustrative circuit diagram illustrating the current control circuit 6 of the power frequency converter of an illustrative embodiment of the present invention. Resistance R1 is resistance for causing the DC voltage for operating the current control circuit 6 to be divided from 300V of the (+) terminal of the smoothing capacitor 7 (C7). A diode D2 is a constant voltage diode for controlling the DC voltage used in the current control circuit 6 to 18V.

Capacitor C4 is a bypass capacitor of 18V DC voltage parallely connected to the diode D2. The resistance R2 and the resistance R3 divide the reference voltage of 0.35V as a base of the reference current for current control from the 18V DC voltage.

In a differential amplifier U1A, a No. 3 (+) input terminal receives an input of the reference voltage of 0.35V and a No. 2 (−) input terminal receives an input of a current detection voltage of a resistor R8 so that a difference voltage between both of the input is amplified and the resultant output is outputted from a No. 1 output terminal to a gate terminal of the current control element Q1.

The current control element Q1 as an active element uses the output voltage from the No. 1 terminal of the differential amplifier U1A to control the current flowing from the drain terminal to the source terminal. The drain terminal of the current control element Q1 is connected via the current protection resistance R7 to the negative terminal of the smoothing capacitor C7. The source terminal of the current control element Q1 is connected via the current detection resistance R6 to the negative terminal of the rectifying diode D1 of the rectifier 4. As a result, the differential amplifier U1A and the current control element Q1 form a negative feedback circuit to provide a feedback control so that the respective voltages of the No. 3 terminal and the No. 2 terminal of the differential amplifier U1A are substantially equal.

The resistance R8 and the 36V constant voltage diode D3 are serially connected and are connected to the negative terminal of the smoothing capacitor C7 and the No. 3 terminal of the differential amplifier U1A. When the voltage therebetween exceeds 36V, current flows to increase the voltage of the No. 3 terminal of the differential amplifier U1A to consequently cause the current control element Q1 to be in an ON status so that the current control element Q1 is prevented from being damaged by an excessive voltage or excessive power.

The resistance R4 and the resistance R5 are serially connected and are connected between the drain terminal of the current control element Q1 and the No. 3 terminal of the differential amplifier U1A. The capacitor C5 is connected between a connection point of the resistance R4 and the resistance R5 and the DC power negative terminal of 18V. As a result, a ripple component of 120 Hz caused by a variation in the instantaneous power consumption of the load device is bypassed to increase or decrease the current flowing in the current control element Q1 in proportion to the drain terminal voltage of the current control element Q1.

By the configuration as described above, when the current control element Q1 has an average operation voltage higher than the reference value, the reference voltage of 0.35V is increased and, when the current control element Q1 has an average operation voltage lower than the reference value on the contrary, the reference voltage of 0.35V is reduced so that the current of the current control element Q1 is compensated to thereby allow the power frequency converter to operate so as to correspond to a change in the average power consumption of the load device and the voltage value of the supply power source.

By configuring the current control circuit 6 as described above, even when a variation in the supply current to the PWM switch 8 caused by a variation in the instantaneous power consumption of the load device leads to a variation in the supply current to the smoothing capacitor 7 (C7), a variation in the charging current of the DC power source is suppressed by limiting the rectified current from the rectifier 4 to the reference voltage value or less during an increase of the rectified current and increasing the current to a value close to the reference voltage value during the decrease of the rectified current.

The following section will consider a general case where current is supplied from a constant current source to a parallel circuit of a capacitor and variable resistance. When the value of the variable resistance is increased or decreased with a fixed cycle, the capacitor includes a ripple voltage repeatedly increasing and decreasing with the same cycle that is superimposed on the charging voltage. The amplitude of this ripple voltage decreases with the increase of the capacity of the capacitor. This charging voltage increases and decreases in proportion to the current from the constant current source. Thus, when the ripple voltage of the capacitor has an excessively-high peak, the charging current cannot be allowed to flow in a constant manner if the potential difference to the circuit constituting the constant current source is insufficient.

Due to this, when the rectified current from the rectifier 4 is controlled to a fixed value, an influence by a variation in the instantaneous power consumption of the load device appears as the ripple voltage of the smoothing capacitor 7 (C7). If this ripple voltage can be accommodated within a fixed range and the operation of the subsequent PWM modulation can be carried out normally, the primary power source can be completely prevented from being influenced by the variation in the instantaneous power consumption of the load device.

However, in order to allow the converter to operate in the favorable status as described above, the smoothing capacitor 7 must have a comparatively high capacity, which may be impractical in some cases. If the smoothing capacitor 7 has a small capacity, a disadvantage as described above is caused where the charging current cannot be allowed to flow in the vicinity of the peak of the ripple voltage superimposed on the charging voltage. According to the characteristic of the present invention, even when the disadvantage as described above exists, the reference current of the current limit circuit 6 is set to an appropriate value to minimize the charging voltage to thereby proportionally increase the charging current in the vicinity of the peak of the ripple voltage so that the primary power source can receive a minimized influence by a variation in the instantaneous power consumption of the load device.

Figure 4:
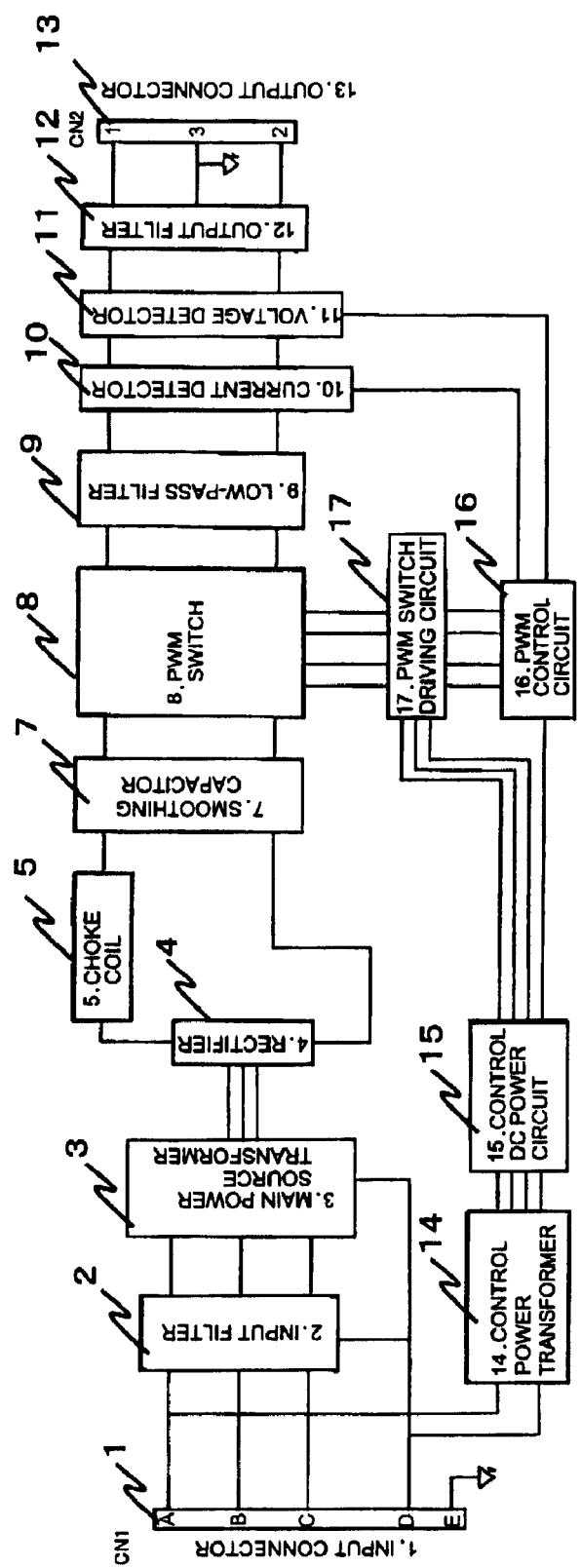
FIG. 4 is a schematic view illustrating a conventional power frequency converter for an electronic device mounted in an aircraft that does not include a power control circuit.
Figure 5A:
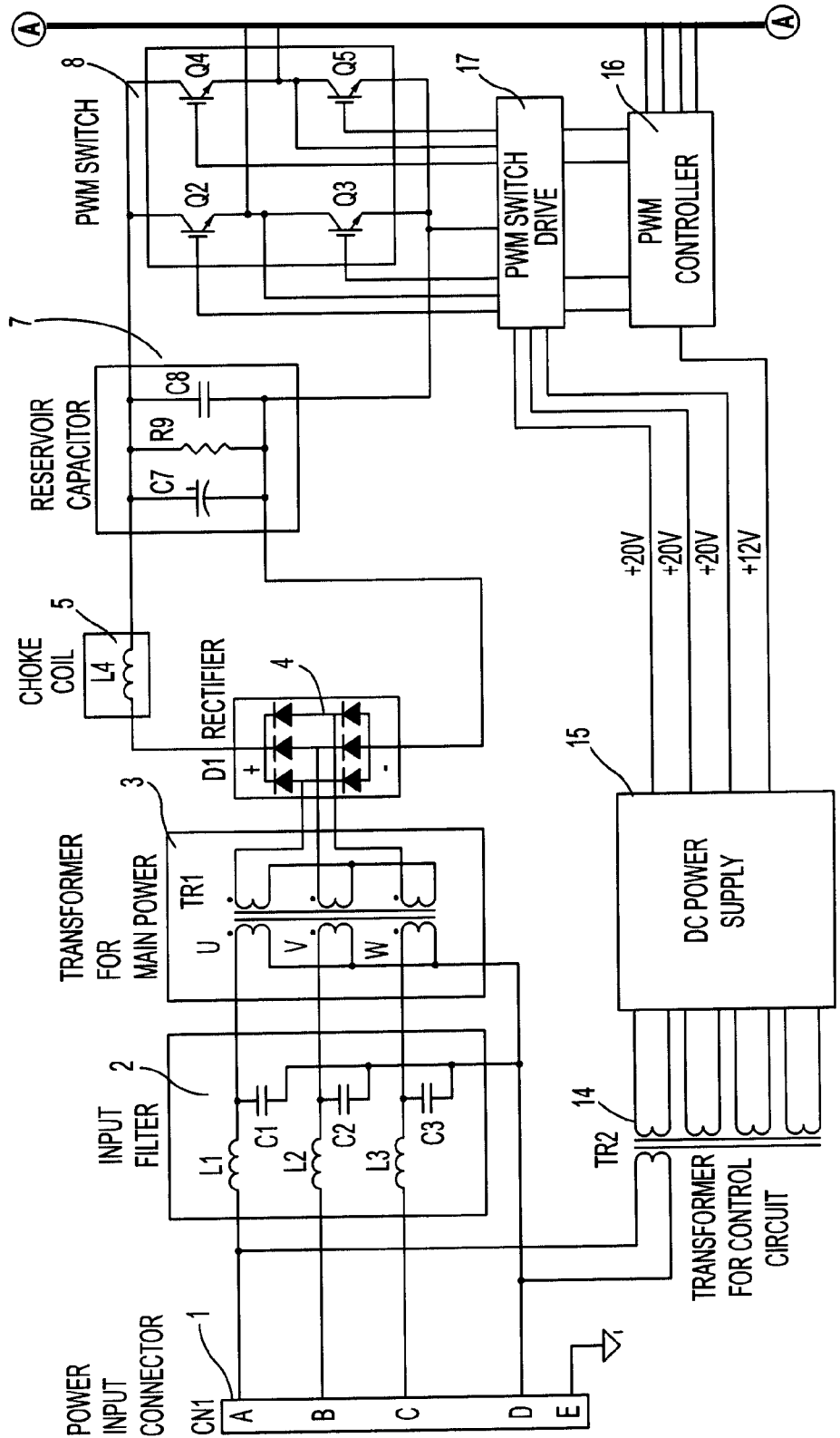
FIGS. 5A-B are a schematic circuit diagram illustrating the conventional power frequency converter for an electronic device mounted in an aircraft that does not include a power control circuit.
Figure 5B:
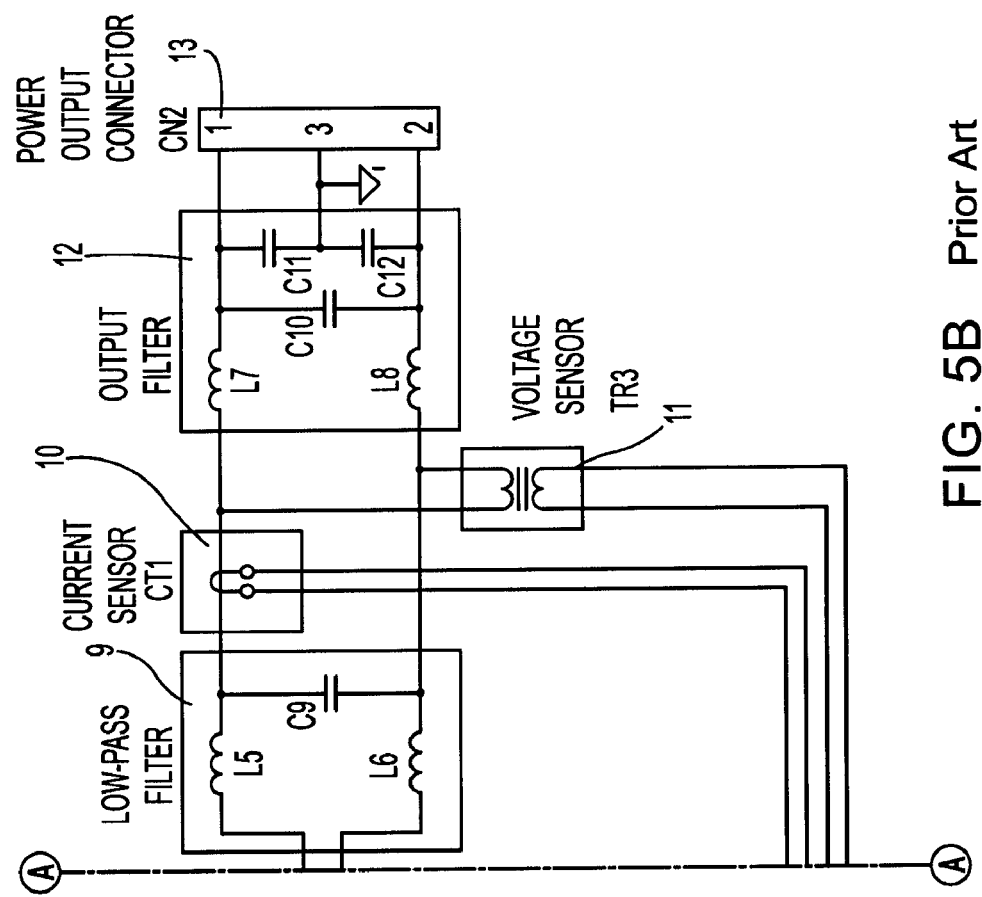

As already described above, FIG. 4 to FIGS. 7A-B illustrate a conventional type power frequency converter not including the current control circuit 6 of FIG. 1. In the case of the conventional type of power frequency converter shown in FIG. 4 and FIGS. 5A-B, a variation in the instantaneous power consumption of the load device causes a change in the generated current from the rectifier 4 and thus a variation of the current of the primary power source cannot be suppressed, thus failing to clear the Load Demand Variation specification required by the aircraft power specification.

Figure 6:
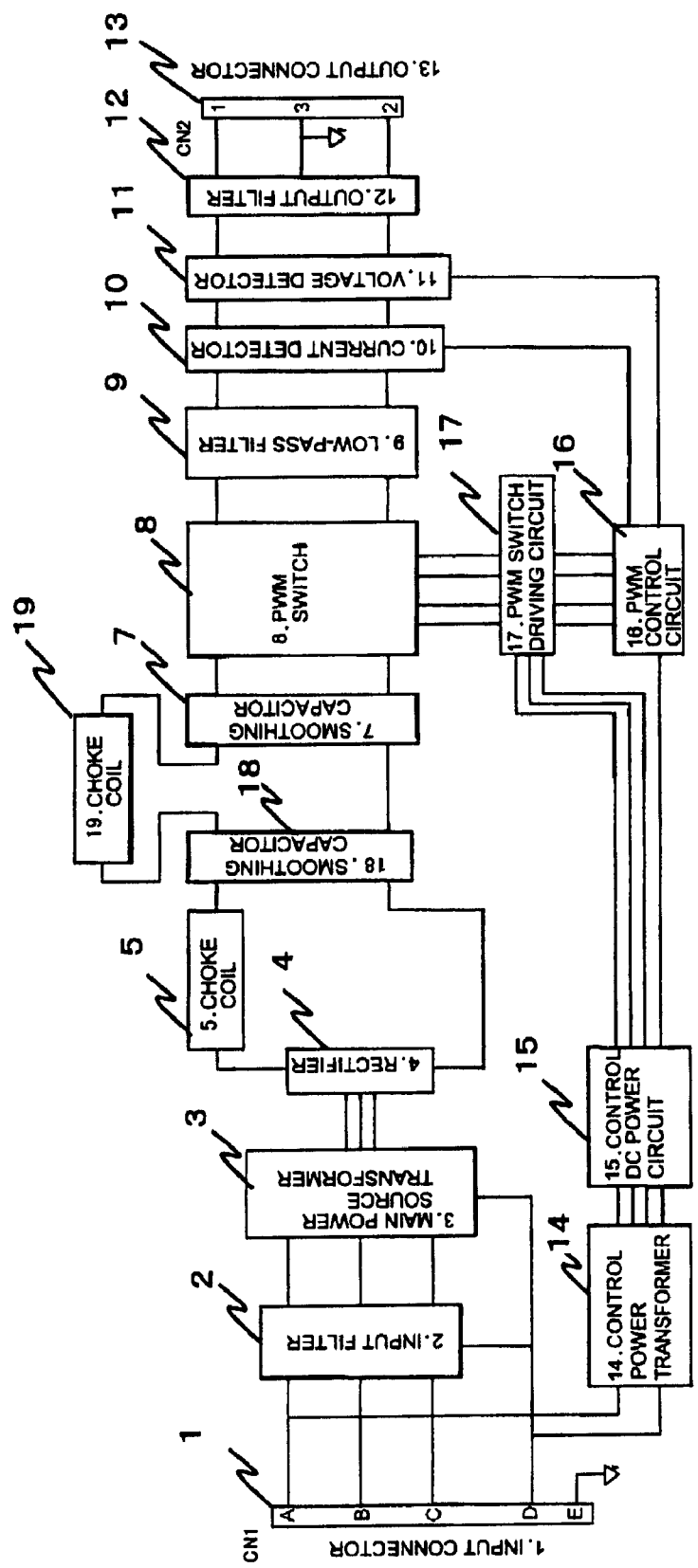
FIG. 6 is a schematic view illustrating a reference example of another conventional power frequency converter for an electronic device mounted in an aircraft in which a DC power source includes a low-pass filter.
Figure 7A:
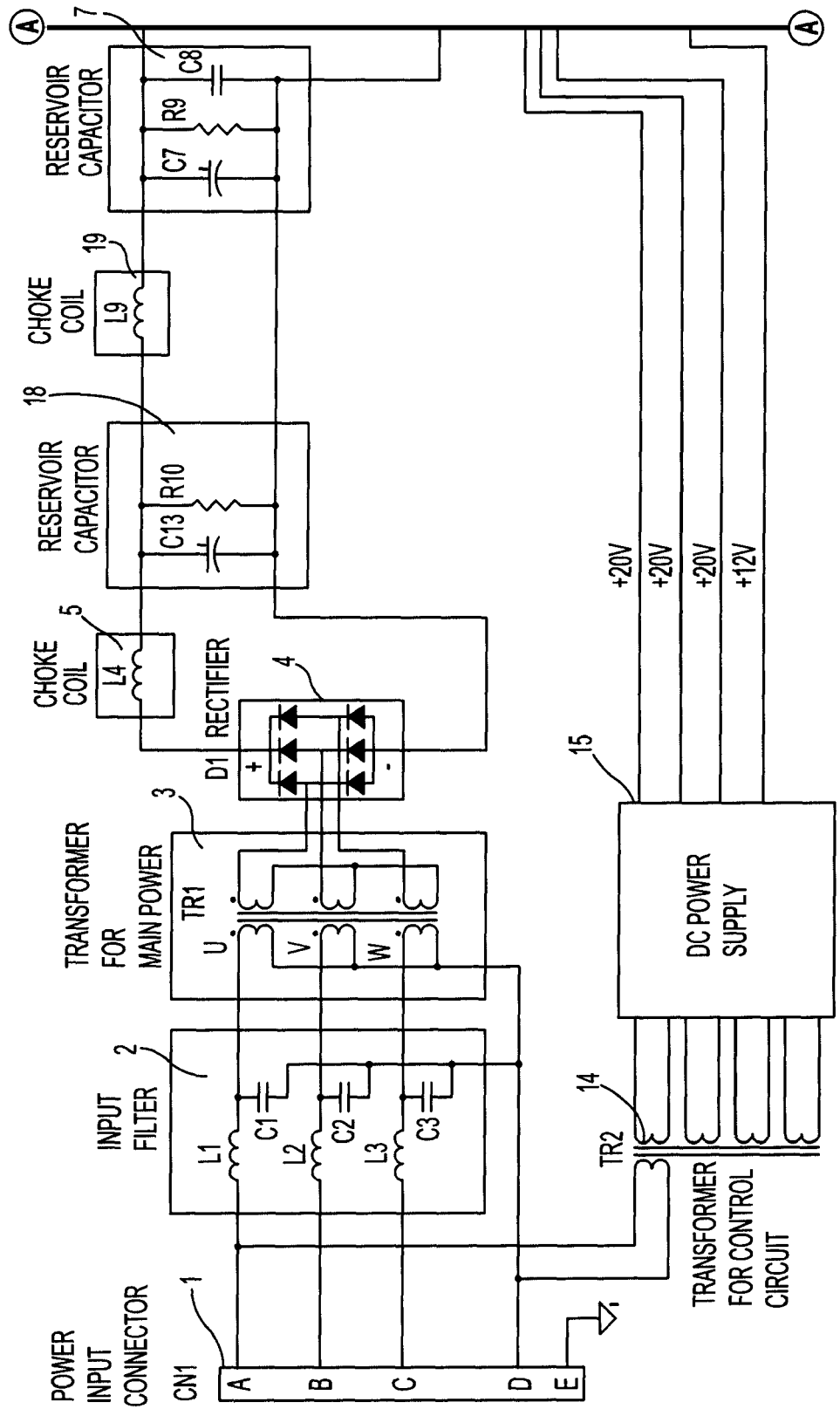
FIGS. 7A-B are a schematic circuit diagram of the reference example of another conventional power frequency converter for an electronic device mounted in an aircraft in which a DC power source includes a low-pass filter.
Figure 7B:
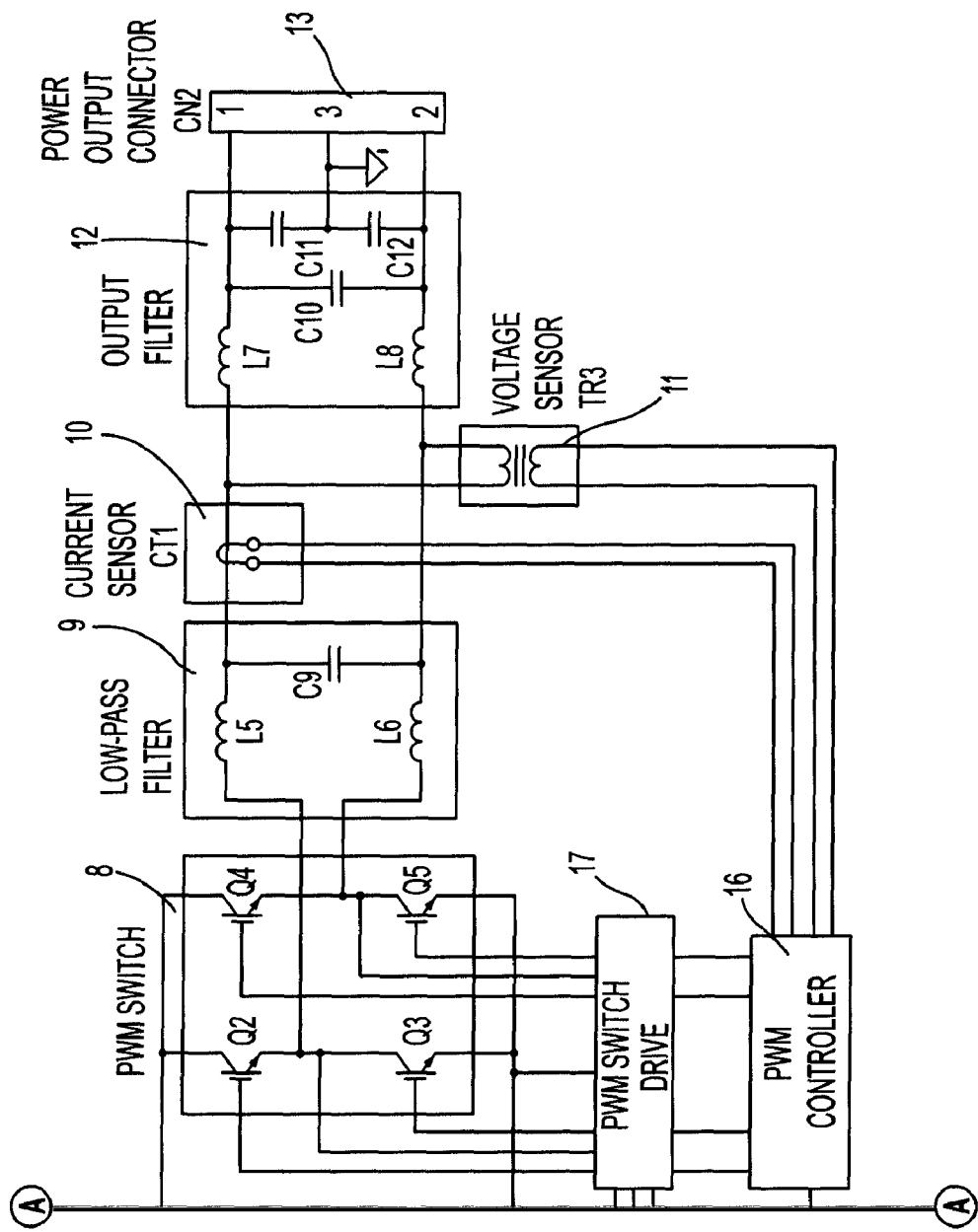

FIG. 6 and FIGS. 7A-B illustrate another type of conventional power frequency converter shown as a reference example of a power frequency converter for an electronic device mounted in an aircraft in which the DC power source includes a low-pass filter for attenuating the ripple voltage superimposed on the charging voltage.

In FIG. 6, the reference numeral 1 denotes an input connector (CN1), the reference numeral 2 denotes an input filter, the reference numeral 3 denotes a main power source transformer, the reference numeral 4 denotes a rectifier, the reference numeral 5 denotes a choke coil, the reference numeral 6 denotes a current control circuit, the reference numeral 7 denotes a smoothing capacitor, the reference numeral 8 denotes a PWM switch, the reference numeral 9 denotes a low-pass filter, the reference numeral 10 denotes a current detector, the reference numeral 11 denotes a voltage detector, the reference numeral 12 denotes an output filter, the reference numeral 13 denotes an output connector (CN2), the reference numeral 14 denotes a control power transformer, the reference numeral 15 denotes a control DC power source circuit, the reference numeral 16 denotes a PWM control circuit, the reference numeral 17 denotes a PWM switch driving circuit, the reference numeral 18 denotes a smoothing capacitor, and the reference numeral 19 denotes a choke coil.

In this example, the rectifier 4 and the smoothing capacitor 7 have additionally therebetween the smoothing capacitor 18 and the choke coil 19 to constitute a n-type low-pass filter so as to attenuate, in front of the rectifier 4, the ripple voltage superimposed on the charging voltage that is caused by an influence by the variation in the instantaneous power consumption of the load device. In the case of the method of the reference example, an increase in the output power from the converter causes an increase in the capacities of the respective elements constituting the low-pass filter. Thus, the converter requires higher volume and weight and the cost is also relatively high.

In the illustrative embodiment of the present invention, a power frequency converter for an electronic device mounted in an aircraft has been described. However, the power frequency converter of the present invention and the current control circuit thereof can be widely applied to as a similar power frequency converter as that for a power source mounted in an aircraft. Furthermore, although this illustrative embodiment has described the power frequency converter and the load device as separate devices, the invention also may be used in another configuration where the load device includes therein the power frequency converter to have an integrated structure.

What is claimed is:

1. A power frequency converter for an electronic device mounted in an aircraft in which a three-phase AC power source is supplied from an aircraft fuselage and is converted by a rectifier and a smoothing capacitor to DC power and the power is subsequently converted by a PWM switch element to have a commercial single-phase power frequency of a load device to thereby supply the power to the load device, the power frequency converter comprising:

a current control circuit having an active element that is connected between the rectifier of the DC power and the smoothing capacitor and that controls a variation in rectified current flowing from the rectifier to the smoothing capacitor, when a variation in the rectified current is caused due to a variation in the instantaneous power consumption of the load device, the current control circuit limits the rectified current to have a value equal to or lower than a predetermined reference current value during an increase of the rectified current to suppress a charging voltage to the smoothing capacitor and increases the rectified current to have a value close to the reference current value during a decrease of the rectified current to thereby suppress the rectified current to a substantially fixed value to thereby mitigate an influence on a primary power source by the variation in the instantaneous power consumption of the load device, wherein when the current is limited to have a value equal to or lower than the predetermined reference current value during an increase of the rectified current of the current control circuit, the reference current value is compensated so that, when the current control circuit has an average operation voltage higher than a reference value, then the reference current value is increased and, when the current control circuit has an average operation voltage lower than the reference value on the contrary, then the reference current value is decreased to thereby allow the power frequency converter to operate so as to correspond to the average power consumption of the load device and a change in the voltage value of the supply power so that the current control circuit automatically moves to a stable operating point to thereby mitigate an influence on the primary power source by the variation in the instantaneous power consumption of the load device.

2. A power frequency converter for an electronic device mounted in an aircraft, wherein the power frequency converter for an electronic device mounted in an aircraft according to claim 1 is integrated with a load device.

* * * * *